United States Patent
Hasel et al.

(10) Patent No.: US 12,379,025 B2
(45) Date of Patent: Aug. 5, 2025

(54) METHOD AND CONTROL UNIT FOR OPERATING A HYDRAULIC SYSTEM OF A TRANSMISSION OF A MOTOR VEHICLE

(71) Applicant: ZF Friedrichshafen AG, Friedrichshafen (DE)

(72) Inventors: Mario Hasel, Wangen (DE); Jakob Mayer, Kressbronn (DE); Anshuman Deshpande, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 155 days.

(21) Appl. No.: 18/342,040

(22) Filed: Jun. 27, 2023

(65) Prior Publication Data

US 2023/0417319 A1  Dec. 28, 2023

(30) Foreign Application Priority Data

Jun. 28, 2022 (DE) ..................... 10 2022 206 494.1

(51) Int. Cl.
*F16H 61/00* (2006.01)

(52) U.S. Cl.
CPC . *F16H 61/0021* (2013.01); *F16H 2061/0037* (2013.01)

(58) Field of Classification Search
CPC .................... F16H 61/0021; F16H 2061/0037
See application file for complete search history.

(56) References Cited

U.S. PATENT DOCUMENTS

| | | | |
|---|---|---|---|
| 7,972,241 B2 * | 7/2011 | Schiele | F16H 57/0434 475/137 |
| 2005/0229592 A1 * | 10/2005 | Kobayashi | B62D 5/091 60/387 |
| 2013/0263827 A1 * | 10/2013 | Hughes | F01M 1/10 123/509 |

FOREIGN PATENT DOCUMENTS

| | | |
|---|---|---|
| DE | 102019204277 A1 | 10/2020 |
| DE | 102019215840 A1 | 4/2021 |

OTHER PUBLICATIONS

German Search Report DE 10 2022 206 494.1, dated Feb. 1, 2023. (12 pages).

\* cited by examiner

*Primary Examiner* — Edwin A Young
(74) *Attorney, Agent, or Firm* — Dority & Manning, P.A.

(57) ABSTRACT

A method for operating a hydraulic system (1) of a transmission (2) of a motor vehicle i includes ascertaining an actual volumetric flow of oil that is deliverable into a primary hydraulic circuit (10) by at least one hydraulic pump (3), ascertaining a target volumetric flow of oil that is required by the primary hydraulic circuit (10), and ascertaining an excess volumetric flow of oil depending on the actual volumetric flow of oil and the target volumetric flow of oil. The excess volumetric flow of oil is distributed to shift elements of the transmission (2) to be actuated, depending on the hydraulic capacity of these shift elements, and is taken into account when limiting the pressure actuation of the shift elements of the transmission (2) to be actuated.

9 Claims, 1 Drawing Sheet

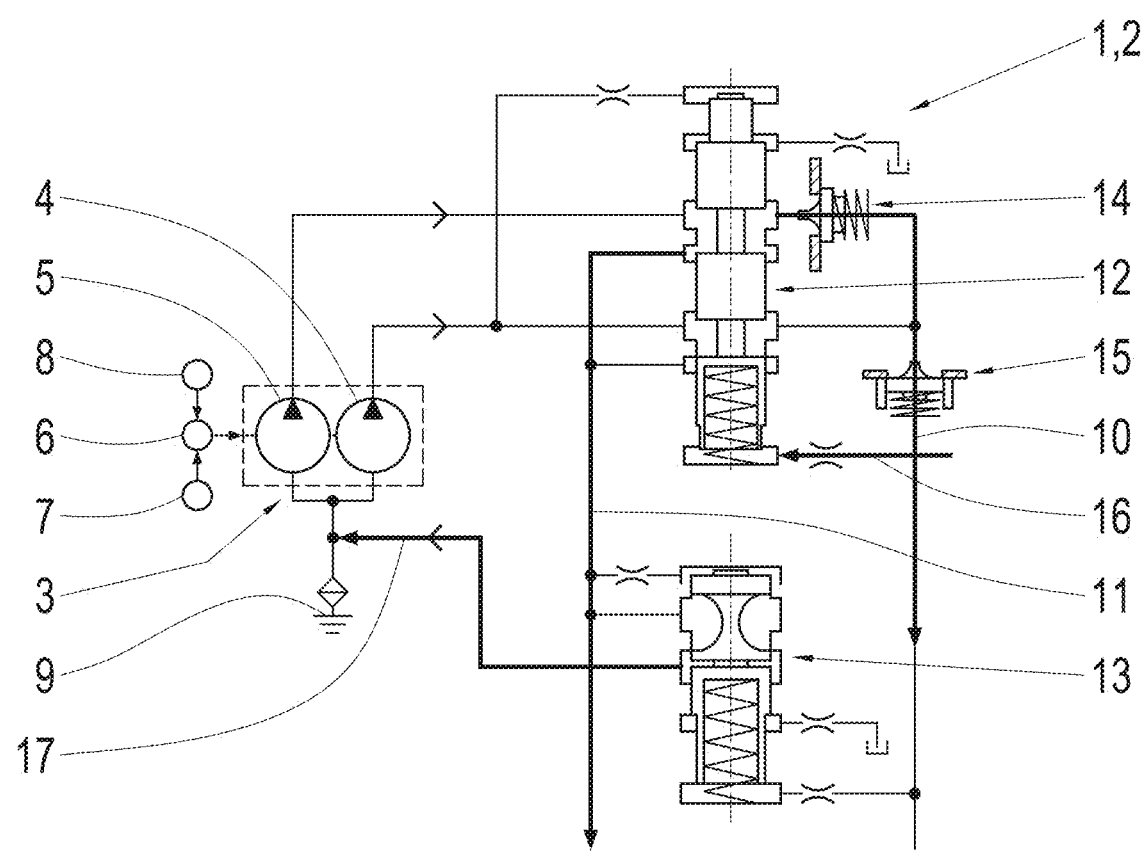

METHOD AND CONTROL UNIT FOR OPERATING A HYDRAULIC SYSTEM OF A TRANSMISSION OF A MOTOR VEHICLE

CROSS-REFERENCE TO RELATED APPLICATION

The present application is related and has right of priority to German Patent Application No. 102022206494.1 filed on Jun. 28, 2022, which is incorporated by reference in its entirety for all purposes.

FIELD OF THE INVENTION

The invention relates generally to a method for operating a hydraulic system of a transmission of a motor vehicle. The invention also relates generally to a control unit for operating a hydraulic system of a transmission of a motor vehicle.

BACKGROUND

A drive train of a motor vehicle includes a prime mover and a transmission connected between the prime mover and a driven end. The transmission converts rotational speeds and torques and provides the available tractive force of the prime mover at the driven end. The transmission includes multiple shift elements, which can be designed as friction-locking shift elements and/or as form-locking shift elements. A friction-locking shift element is, in particular, a clutch or a brake. A form-locking shift element is, in particular, a dog. In every engaged gear of a transmission, a first number of the shift elements of the transmission is engaged and a second number of the shift elements of the transmission is disengaged. In order to implement a gear ratio change, at least one previously engaged shift element is disengaged and at least one previously disengaged shift element is engaged. The transmission includes a hydraulic system for the purpose of actuating the shift elements of a transmission. The hydraulic system has a primary hydraulic circuit and a secondary hydraulic circuit, the primary hydraulic circuit being used for the pressure actuation of the shift elements and the secondary hydraulic circuit being used to cool and/or lubricate assemblies of the transmission. The hydraulic circuit has at least one hydraulic pump, which delivers a volumetric flow of oil into the primary hydraulic circuit and into the secondary hydraulic circuit.

DE 10 2019 204 277 A1 discloses a hydraulic system of a transmission, which includes a hydraulic pump in the form of a dual circuit pump. Such a dual circuit pump has a primary flow and a secondary flow. An amount of oil delivered by the primary flow is delivered primarily into the primary hydraulic circuit. An amount of oil delivered by the secondary flow can be delivered into the secondary hydraulic circuit and/or the primary hydraulic circuit depending on the switching position of a system pressure valve of the hydraulic system.

In order to ensure that a transmission functions properly, it is important not to overload the hydraulic system. An overload of the hydraulic system is distinguished by the fact that a higher volumetric flow of oil is requested on the control side than the at least one hydraulic pump can actually provide. Such an insufficient supply can result in pressure drops, poor shift quality and poor gearshift dynamics.

SUMMARY OF THE INVENTION

Example aspects of the present invention provide a method and a control unit for operating a hydraulic system of a transmission of a motor vehicle, with which high-quality gear shifts can be carried out with superior gearshift dynamics and with which, despite the highest possible gearshift dynamics, a risk of overloading the hydraulic system and of pressure drops caused as a result is reduced.

According to example aspects of the invention, an actual volumetric flow of oil that is deliverable into the primary hydraulic circuit by the at least one hydraulic pump is ascertained.

Moreover, according to example aspects of the invention, a target volumetric flow of oil that is required by the primary hydraulic circuit is ascertained.

According to example aspects of the invention, an excess volumetric flow of oil is ascertained depending on the actual volumetric flow of oil and the target volumetric flow of oil.

According to example aspects of the invention, the excess volumetric flow of oil is distributed to the shift elements of the transmission to be actuated, depending on the hydraulic capacity of these shift elements and is taken into account when limiting the pressure actuation of the shift elements of the transmission to be actuated.

According to volumetric flow of oil the invention, the actual volumetric flow of oil that is providable by the at least one hydraulic pump as well as the target volumetric flow of oil that is requested and/or required by the primary hydraulic circuit are ascertained and compared. Depending on a difference between the actual volumetric flow of oil and the target volumetric flow of oil, i.e., depending on an excess volumetric flow of oil, the pressure actuation of every shift element of the transmission to be actuated is limited, specifically by determining a maximum possible volumetric flow of oil for each of the shift elements to be actuated and taking this into account during the actuation.

Example aspects of the invention allow high dynamics to be ensured during the actuation of the shift elements, specifically without the risk of overloading the hydraulic system and, accordingly, without the risk of pressure drops.

When the actual volumetric flow of oil is greater than the target volumetric flow of oil and, accordingly, the excess volumetric flow of oil is positive, more of the excess volumetric flow of oil is distributed to a shift element having a relatively high hydraulic capacity than to a shift element having a relatively low hydraulic capacity such that a limitation of the pressure actuation of a shift element having a relatively high hydraulic capacity is raised further than is a limitation of the pressure actuation of a shift element having a relatively low hydraulic capacity.

When the actual volumetric flow of oil is less than the target volumetric flow of oil and the excess volumetric flow of oil is negative, more of the excess volumetric flow of oil is distributed to a shift element having a relatively low hydraulic capacity than to a shift element having a relatively high hydraulic capacity such that a limitation of the pressure actuation of a shift element having a relatively low hydraulic capacity is lowered further than is a limitation of the pressure actuation of a shift element having a relatively high hydraulic capacity.

This approach to limiting the pressure actuation and, accordingly, to determining the maximal permissible volumetric flows for every shift element to be actuated is preferred.

Preferably, the hydraulic pump of the hydraulic system is a dual circuit pump, the dual circuit pump having a primary flow, which delivers hydraulic oil primarily into a primary hydraulic circuit of the hydraulic system, and a secondary flow, which delivers hydraulic oil into the primary hydraulic circuit and/or into the secondary hydraulic circuit of the hydraulic system depending on the switching position of a system pressure valve. The state of the system pressure valve and/or a state change of the system pressure valve are/is taken into account when ascertaining the actual volumetric flow of oil that is deliverable into the primary hydraulic circuit. When the switching condition of the system pressure valve and thus the distribution of the volumetric flow of oil delivered by the dual circuit pump are additionally taken into account, superior gearshift dynamics can be particularly advantageously provided while avoiding an overload of the hydraulic system.

BRIEF DESCRIPTION OF THE DRAWINGS

Exemplary embodiments of the invention are explained in greater detail with reference to the drawings, without being limited thereto, wherein:

The sole figure shows a cutout portion of a hydraulic system of a motor vehicle transmission.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

The sole figure shows a cutout portion of a hydraulic system 1 of a transmission 2 of a motor vehicle.

The hydraulic system 1 of the transmission 2 is used for the pressure actuation of shift elements of the transmission and for lubricating and/or cooling assemblies of the transmission 2.

The hydraulic system 1 has at least one hydraulic pump 3, which, in the exemplary embodiment shown, is in the form of a dual circuit pump having a primary flow 4 and a secondary flow 5.

In the exemplary embodiment shown, the hydraulic pump 3 is drivable starting from an internal combustion engine 7 as well as starting from an electric machine 8, the internal combustion engine 7 and the electric machine 8 acting on the input shaft of the hydraulic pump 3 via a superposition gear unit 6, which is preferably in the form of a planetary gear.

If, for example, the rotational speed of the internal combustion engine 7 is too low to provide a sufficient supply of hydraulic oil for the hydraulic system 1 via the hydraulic pump 3, a rotational speed of the electric machine 8 can be superimposed on the rotational speed of the internal combustion engine 7 at the superposition gear unit 6.

The hydraulic pump 3 scavenges oil out of an oil sump 9 depending on the rotational speed of the hydraulic pump 3, the primary flow 4 of the hydraulic pump 3 delivering the oil taken up by the primary flow 4 exclusively into a primary hydraulic circuit 10. The secondary flow 5 of the hydraulic pump 3 can deliver the oil scavenged by same both into the primary hydraulic circuit 10 and into a secondary hydraulic circuit 11, specifically depending on the switching position of a system pressure valve 12.

The primary flow 10 is used for the pressure actuation of the shift elements of the transmission 2. The secondary flow 11 cools and/or lubricates assemblies of the transmission 2.

Depending on the switching position of the switching valve 12, the secondary flow 5 of the hydraulic pump 3 delivers all the oil into the secondary hydraulic circuit 11 or partly into the secondary hydraulic circuit 11 and partly into the primary hydraulic circuit 10 or all the oil into the primary hydraulic circuit 10. The sole figure shows a pilot pressure line 16, which extends to the system pressure valve 12. When a pressure in the primary hydraulic circuit 10, which forms in the primary hydraulic circuit 10 as a result of the delivery of the hydraulic oil starting from the hydraulic pump 3, is less than the pilot pressure, hydraulic oil delivered by the primary flow 4 and by the secondary flow 5 of the hydraulic pump 3 is delivered exclusively and completely into the primary hydraulic circuit 10. Check valves 14, 15 in the primary hydraulic circuit 10 prevent a return flow of hydraulic oil out of the primary hydraulic circuit 10 toward the two flows 4, 5 of the hydraulic pump 3.

The sole figure also shows a lubricating valve 13 within the secondary hydraulic circuit 11. When a rotational speed of the hydraulic pump 3 and thus a displaced volume of same increases to such an extent that an excess displaced volume is present in the secondary hydraulic circuit 11, this excess volume is delivered into a suction loading 17.

The above-described fundamental mode of operation of a hydraulic system 1 is basically known to a person skilled in the art, who is addressed here. It is pointed out that the configuration of the hydraulic system shown in the sole figure is exemplary in nature. A single-flow hydraulic pump, i.e., a single-circuit pump, can also be used as a hydraulic pump, which then delivers hydraulic oil into the primary hydraulic circuit 10 and into the secondary hydraulic circuit 11.

Moreover, the lubricating valve 13 from the sole figure is optional. Instead of the lubricating valve 13, a priority valve can also be present, which splits the oil flow within the secondary hydraulic circuit 11 between different consumers of the secondary hydraulic circuit to be cooled and/or to be lubricated.

In order to then carry out gear shifts with superior gearshift dynamics without the risk of overloading the hydraulic system 1, it is provided according to example aspects of the invention that an actual volumetric flow of oil that is deliverable into the primary hydraulic circuit 10 by the at least one hydraulic pump 3 is ascertained.

Moreover, a target volumetric flow of oil that is required by the primary hydraulic circuit 10 is ascertained.

The actual volumetric flow of oil that is deliverable by the hydraulic pump 3 is preferably ascertained depending on the input speed of the hydraulic pump 3, which, in the sole figure, can depend on the rotational speed of the internal combustion engine 7 and also on the rotational speed of the electric machine 8. This can be achieved via calculation or even on the basis of a characteristic map of the hydraulic pump 3.

The target volumetric flow of oil required by the primary hydraulic circuit 10 is ascertained depending on the target volumetric flow of all shift elements of the transmission 2 that are currently to be actuated.

An excess volumetric flow of oil is ascertained depending on the actual volumetric flow of oil that is determined and the target volumetric flow of oil that is determined, the excess volumetric flow of oil corresponding to the difference between the actual volumetric flow of oil and the target volumetric flow of oil. This excess volumetric flow of oil is typically positive, although the excess volumetric flow of oil can also be negative. When an excess volumetric flow of oil is negative, the actual volumetric flow that is delivered into the primary hydraulic circuit 10 by the hydraulic pump 3 is less than the target volumetric flow of oil required by the primary hydraulic circuit 10.

The excess volumetric flow of oil, which is ascertained in this way and can be positive or negative, is distributed to the shift elements of the transmission 2 to be actuated, depending on the hydraulic capacity of these shift elements and is taken into account when limiting the pressure actuation of the shift elements of the transmission 2.

The hydraulic capacity of a particular shift element of the transmission 2 is that much greater, the greater is a shifting travel covered by the particular shift element if a predefined change occurs to the actuating pressure of the particular shift element. The hydraulic capacity is greater, in particular, for a shift element that is disengaged completely or to a relatively great extent than for a shift element that is completely or nearly completely engaged.

When the actual volumetric flow of oil that is delivered into the primary hydraulic circuit 10 by the hydraulic pump 3 is greater than the target volumetric flow of oil requested by the primary hydraulic circuit 10, i.e., when the excess volumetric flow of oil is positive, more of the excess volumetric flow of oil is distributed to a shift element having a relatively high hydraulic capacity than to a shift element having a relatively low hydraulic capacity, namely such that a limitation of the pressure actuation of a shift element having a relatively high hydraulic capacity is raised further within the scope of the available excess volumetric flow of oil than is a limitation of the pressure actuation of a shift element having a relatively low hydraulic capacity.

However, if the excess volumetric flow of oil is negative, i.e., if the actual volumetric flow of oil delivered into the primary hydraulic circuit 10 by the hydraulic pump 3 is less than the target volumetric flow of oil requested by the primary hydraulic circuit 10, the excess volumetric flow of oil is divided among the shift elements such that more of the excess volumetric flow of oil is distributed to a shift element having a relatively low hydraulic capacity than to a shift element having a relatively high hydraulic capacity such that a limitation of the pressure actuation of a shift element having a relatively low hydraulic capacity is lowered further than is a limitation of the pressure actuation of a shift element having a relatively high hydraulic capacity. When an excess volumetric flow of oil is negative, a shift element having a relatively low hydraulic capacity is thus influenced by a greater extent with respect to its limitation than is a shift element having a relatively high hydraulic capacity.

The aforementioned measures are implemented in every calculation cycle of a control unit carrying out the method according to example aspects of the invention.

As mentioned above, the hydraulic pump 3 of the hydraulic system 1 from the sole figure is a dual circuit pump having the primary flow 4 and the secondary flow 5. The state of the system pressure valve 12 and/or a state change of the system pressure valve 12 are/is taken into account when ascertaining the actual oil volume that is deliverable into the primary hydraulic circuit 10 by the hydraulic pump 3.

If it is exclusively the primary flow 4 that delivers hydraulic oil into the primary hydraulic circuit 10, the actual volumetric flow of oil depends exclusively on the primary flow 4. If the primary flow 4 as well as the secondary flow 5 deliver hydraulic oil into the primary hydraulic circuit 10, the actual volumetric flow of oil depends on both flows 4, 5 of the hydraulic pump 3.

If a state of the system pressure valve 12 changes, the switching time that the system pressure valve 12 requires for the state change is taken into account when determining the actual volumetric flow of oil.

Within the meaning of the present invention, the pressure actuation of the shift elements of the transmission 2 that are currently to be actuated is thus limited depending on the actual volumetric flow of oil that is currently providable by the hydraulic pump 3 of the hydraulic system 1 and by the target volumetric flow of oil that is currently required by the primary hydraulic circuit 10. As a result, a gear shift can be carried out with high dynamics and a hydraulic overload of the hydraulic system 1 is prevented.

Example aspects of the invention also relate to a control unit, which is designed to automatically carry out the above-described method on the control side. The control unit is preferably an electrical or electronic transmission control unit, which has components for carrying out the method according to example aspects of the invention. These components include hardware and software. The hardware includes data interfaces for exchanging data with the assemblies contributing to the execution of the method according to example aspects of the invention, such as, for example, with the hydraulic pump 3. The hardware also includes a processor for data processing and a memory for data storage. The software includes program modules, which are implemented in the control unit to automatically carry out the method according to example aspects of the invention.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 hydraulic system
2 transmission
3 hydraulic pump
4 primary flow
5 secondary flow
6 superposition gear unit
7 internal combustion engine
8 electric machine
9 oil sump
10 primary hydraulic circuit
11 secondary hydraulic circuit
12 system pressure valve
13 lubricating valve
14 check valve
15 check valve
16 pilot pressure line
17 suction loading

The invention claimed is:

1. A method for operating a hydraulic system (1) of a transmission (2) of a motor vehicle, the hydraulic system (1) including a primary hydraulic circuit (10) for pressure actuation of shift elements of the transmission (2), a secondary hydraulic circuit (11) for cooling and/or lubricating assemblies of the transmission (2), and at least one hydraulic pump (3) that delivers a volumetric flow of oil into the primary hydraulic circuit (10) and into the secondary hydraulic circuit (11), the method comprising:

ascertaining an actual volumetric flow of oil that is deliverable into the primary hydraulic circuit (10) by the at least one hydraulic pump (3);

ascertaining a target volumetric flow of oil that is required by the primary hydraulic circuit (10);

ascertaining an excess volumetric flow of oil depending on the actual volumetric flow of oil and the target volumetric flow of oil; and distributing the excess volumetric flow of oil to the shift elements of the transmission (2) to be actuated, depending on hydraulic capacity of the shift elements of the transmission (2) to be actuated, and limiting pressure actuation of the shift elements of the transmission (2) to be actuated based at least in part on the excess volumetric flow of oil.

2. The method of claim 1, wherein:

a relatively large hydraulic capacity of a shift element of the transmission (2) corresponds to a relatively large shifting travel covered by the shift element when a predefined change occurs to an actuating pressure of the shift element; and a relatively small hydraulic capacity of the shift element of the transmission (2) corresponds to a relatively small shifting travel covered by the shift element when the predefined change occurs to the actuating pressure of the shift element.

3. The method of claim 2, wherein, when the actual volumetric flow of oil is greater than the target volumetric flow of oil such that the excess volumetric flow of oil is positive, more of the excess volumetric flow of oil is distributed to the shift element with the relatively large hydraulic capacity than that to the shift element with the relatively small hydraulic capacity such that a limitation of the pressure actuation of the shift element with the relatively large hydraulic capacity is raised further than is a limitation of the pressure actuation of the shift element with the relatively small hydraulic capacity.

4. The method of claim 2, wherein, when the actual volumetric flow of oil is less than the target volumetric flow of oil such that the excess volumetric flow of oil is negative, more of the excess volumetric flow of oil is distributed to the shift element with the relatively small hydraulic capacity than to the shift element with the relatively large hydraulic capacity such that a limitation of the pressure actuation of the shift element with the relatively small hydraulic capacity is lowered further than is a limitation of the pressure actuation of the shift element with the relatively large hydraulic capacity.

5. The method of claim 1, wherein:

the at least one hydraulic pump (3) of the hydraulic system (1) is a dual circuit pump;

the dual circuit pump comprises a primary flow (4) that delivers hydraulic oil primarily into the primary hydraulic circuit (10) of the hydraulic system (1) and a secondary flow (5) that delivers hydraulic oil into the primary hydraulic circuit (10) and/or into the secondary hydraulic circuit (11) of the hydraulic system (1) depending on a switching position of a system pressure valve (12); and ascertaining the actual volumetric flow of oil that is deliverable into the primary hydraulic circuit (10) comprises ascertaining the actual volumetric flow of oil that is deliverable into the primary hydraulic circuit (10) based at least in part on a state of the system pressure valve (12) and/or a state change of the system pressure valve (12).

6. The method of claim 1, wherein ascertaining the actual volumetric flow of oil that is deliverable into the primary hydraulic circuit (10) by the at least one hydraulic pump (3) comprises ascertaining the actual volumetric flow of oil that is deliverable into the primary hydraulic circuit (10) based at least in part on an input speed of the at least one hydraulic pump (3).

7. The method of claim 6, wherein ascertaining the actual volumetric flow of oil that is deliverable into the primary hydraulic circuit (10) by the at least one hydraulic pump (3) comprises ascertaining the actual volumetric flow of oil that is deliverable into the primary hydraulic circuit (10) based at least in part on a characteristic map or via calculation depending on the input speed of the at least one hydraulic pump (3).

8. The method of claim 1, wherein ascertaining the target volumetric flow of oil required by the primary hydraulic circuit (10) comprises ascertaining the target volumetric flow of oil required by the primary hydraulic circuit (10) based at least in part on a target volumetric flow of oil for all shift elements of the transmission (2) to be actuated, the target volumetric flow being required for the pressure actuation.

9. A control unit for operating the hydraulic system of the transmission of the motor vehicle, wherein the control unit is configured for automatically carrying out the method of claim 1.

* * * * *